United States Patent
Kao et al.

(10) Patent No.: US 10,161,517 B1
(45) Date of Patent: Dec. 25, 2018

(54) METHOD AND APPARATUS TO CONTROL A CONTINUOUSLY VARIABLE TRANSMISSION

(71) Applicant: GM GLOBAL TECHNOLOGY OPERATIONS LLC, Detroit, MI (US)

(72) Inventors: Chi-kuan Kao, Troy, MI (US); K V Hebbale, Troy, MI (US); Chunhao J. Lee, Troy, MI (US); Heather N. Allen, Pinckney, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 37 days.

(21) Appl. No.: 15/616,454

(22) Filed: Jun. 7, 2017

(51) Int. Cl.
*F16H 61/662* (2006.01)
*F16H 9/18* (2006.01)

(52) U.S. Cl.
CPC ......... *F16H 61/66272* (2013.01); *F16H 9/18* (2013.01); *F16H 2061/66277* (2013.01); *F16H 2061/66281* (2013.01)

(58) Field of Classification Search
None
See application file for complete search history.

(56) References Cited

U.S. PATENT DOCUMENTS

| | | | | |
|---|---|---|---|---|
| 6,283,893 | B1* | 9/2001 | Fritzner | F16D 48/06 474/11 |
| 6,626,031 | B2* | 9/2003 | Reuschel | G01M 13/023 73/115.02 |
| 7,806,790 | B2* | 10/2010 | Iwatsuki | F16H 61/66272 474/11 |
| 8,221,286 | B2* | 7/2012 | Van Der Noll | F16H 61/66272 474/62 |
| 8,600,634 | B2* | 12/2013 | Van Der Sluid | F16H 61/66272 474/11 |
| 8,843,287 | B2* | 9/2014 | Doihara | F16H 61/66272 701/60 |
| 8,914,201 | B2* | 12/2014 | Doihara | F16H 61/66272 477/45 |

(Continued)

OTHER PUBLICATIONS

Taiko Ando, Tooru Tagasaki, Shuji Ichijo, Kyohei Sakagami, and Soichiro Sumida; Honda R&D Co Ltd; Improvement of Transmission Efficiency in CVT Shifting Mechanism Using Metal Pushing V-Belt; SAE International 2015-01-1103; pp. 1391-1397; Published Apr. 14, 2015.

*Primary Examiner* — Dirk Wright
(74) *Attorney, Agent, or Firm* — Quinn IP Law (57) ABSTRACT

A powertrain system includes a torque generating device to transfer torque to a driveline via a CVT, wherein the CVT includes a first pulley coupled to a second pulley via a flexible continuous device to transfer torque therebetween. A controller including a processor and memory is operatively connected to the CVT. The controller includes an instruction set that is executable to dynamically monitor operating parameters associated with an input force and an output force of the CVT and determine an amplitude variation of one of the operating parameters. The controller is disposed to detect an impending slip event based upon the amplitude variation, wherein the impending slip event is associated with a macro-slip condition on the flexible continuous device. Operation of the CVT is controlled to preclude the impending slip event.

17 Claims, 4 Drawing Sheets

(56) References Cited

U.S. PATENT DOCUMENTS

| | | | |
|---|---|---|---|
| 8,914,203 B2 * | 12/2014 | Kodama | F16H 61/66272 477/45 |
| 8,914,204 B2 * | 12/2014 | Kodama | F16H 61/66272 477/45 |
| 8,977,447 B2 * | 3/2015 | Sakagami | F16H 59/14 477/45 |
| 9,334,954 B2 * | 5/2016 | Cho | F16H 61/66272 |
| 2006/0166768 A1 * | 7/2006 | Reuschel | F16H 61/66272 474/8 |

* cited by examiner

METHOD AND APPARATUS TO CONTROL A CONTINUOUSLY VARIABLE TRANSMISSION

INTRODUCTION

Powertrains having an internal combustion engine coupled to a continuously or infinitely variable transmission (CVT) may be employed to provide tractive effort in vehicles. A CVT is capable of continuously changing an output/input speed ratio over a range between a minimum (underdrive) ratio and a maximum (overdrive) ratio, thus permitting infinitely variable selection of engine operation in response to an output torque request.

SUMMARY

A powertrain system disposed to transfer mechanical power to a driveline is described, and includes a torque generating device disposed to transfer torque to the driveline via a continuously variable transmission (CVT), wherein the CVT includes an input member that is coupled to a first pulley and an output member that is coupled to a second pulley and wherein the first pulley is rotatably coupled to the second pulley via a flexible continuous device that is disposed to transfer torque therebetween. A controller including a processor and memory is operatively connected to the CVT. The controller includes an instruction set that is executable to dynamically monitor operating parameters associated with an input force and an output force of the CVT and determine an amplitude variation of one of the operating parameters. The controller is disposed to detect an impending slip event based upon the amplitude variation, wherein the impending slip event is associated with a macro-slip condition on the flexible continuous device. Operation of the CVT is controlled to preclude the impending slip event.

An aspect of the disclosure includes controlling the operation of the CVT by controlling pressure commands to the first and second pulleys, and then monitoring the pressure commands to the first and second pulleys, determining magnitudes of the pressure commands to the first and second pulleys associated with the impending slip event, and setting minimum allowable pressure commands for the first and second pulleys based upon the magnitudes of the pressure commands to the first and second pulleys associated with the occurrence of the macro-slip condition.

Another aspect of the disclosure includes the macro-slip condition being an under-pressure condition on the flexible continuous device.

Another aspect of the disclosure includes dynamically monitoring operating parameters associated with an input force and an output force of the CVT by dynamically monitoring rotational speeds of the input and output members.

Another aspect of the disclosure includes dynamically monitoring operating parameters associated with an input force and an output force of the CVT by dynamically monitoring clamping pressures exerted by the first and second pulleys on the continuous rotatable device.

Another aspect of the disclosure includes dynamically monitoring operating parameters associated with an input force and an output force of the CVT by dynamically monitoring torsional forces, e.g., torque on the input and output members.

Another aspect of the disclosure includes monitoring amplitude variation of one of the operating parameters by monitoring a quantity of occurrences wherein the amplitude of the operating parameter is greater than a threshold amplitude.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid obscuring the disclosure. Furthermore, the drawings are in simplified form and are not to precise scale. Furthermore, the disclosure, as illustrated and described herein, may be practiced in the absence of an element that is not specifically disclosed herein.

Figure 1:
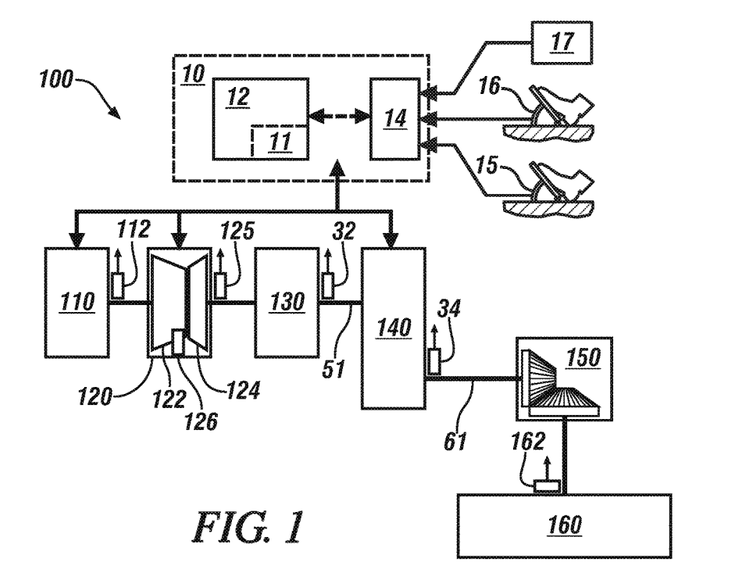
FIG. 1 schematically illustrates elements of a powertrain system that includes an internal combustion engine rotatably coupled to a continuously variable transmission (CVT) via a torque converter and a gear box, in accordance with the disclosure.

Referring now to the drawings, wherein the depictions are for the purpose of illustrating certain exemplary embodiments and not for the purpose of limiting the same, FIG. 1 schematically illustrates elements of a powertrain system 100 that includes a torque-generating device in the form of an internal combustion engine (engine) 110, and the engine 110 is rotatably coupled to a continuously variable transmission (CVT) 140 via a torque converter 120 and a gear box 130. The powertrain system 100 couples via a driveline 150 to a vehicle wheel 160 to provide tractive effort when employed on a vehicle. Operation of the powertrain system 100 is monitored by and controlled by a control system 10 in response to driver commands and other factors. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The engine 110 may be an internal combustion engine that is capable of transforming hydrocarbon fuel to mechanical power to generate torque in response to commands originating from the control system 10. The torque converter 120 is a device providing fluidic coupling between its input and output members for transferring torque, and preferably includes a pump 122 that is coupled to the engine 110, a turbine 124 that is coupled via the output member to the gear box 130 and a torque converter clutch 126 that locks rotation of the pump 122 and turbine 124 and is controllable by the control system 10. The output member of the torque converter 120 rotatably couples to the gear box 130, which includes meshed gears or other suitable gearing mechanisms that provide reduction gearing between the torque converter 120 and the CVT 140. Alternatively the gear box 130 may be another suitable gear configuration for providing gearing between the engine 110, the torque converter 120 and the CVT 140, including, by way of non-limiting examples, a chain drive gear configuration or a planetary gear configuration. In alternative embodiments, either or both the torque converter 120 and the gear box 130 may be omitted.

The gear box 130 includes an output member that rotatably couples to the CVT 140 via an input member 51. One embodiment of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gearset, a chain drive gearset or another suitable gear arrangement for transferring torque to one or more vehicle wheels 160.

In one alternative embodiment, the engine 110, torque converter 120 and the gear box 130 may be replaced with an electric motor/generator. In one alternative embodiment, the engine 110, torque converter 120 and the gear box 130 may be replaced with a hydraulically-powered torque machine. In one alternative embodiment, the engine 110, torque converter 120 and the gear box 130 may be replaced with a pneumatically-powered torque machine.

The powertrain system 100 preferably includes one or more sensing devices for monitoring rotational speeds of various devices, including, e.g., an engine speed sensor 112, a torque converter turbine speed sensor 125, a CVT variator input speed sensor 32, a CVT variator output speed sensor 34, and a wheel speed sensor 162. Each of the aforementioned speed sensors may be a suitable position/speed sensing device, such as a Hall-effect sensor. Each of the aforementioned speed sensors communicates with the control system 10. As used herein the term 'speed' and related terms refer to a rotational speed of a rotating member, unless specifically indicated otherwise. As used herein the term 'position' and related terms refer to a rotational or angular position of a rotating member, unless specifically indicated otherwise.

The control system 10 preferably includes one or a plurality of controllers 12 and a user interface 14. A single controller 12 is shown for ease of illustration. The controller 12 may include a plurality of controller devices wherein each of the controllers 12 is associated with monitoring and controlling a single system. This may include an engine control module (ECM) for controlling the engine 110 and a transmission controller (TCM) for controlling the CVT 140 and for monitoring and controlling a single subsystem, e.g., a torque converter clutch. The controller 12 preferably includes a memory device 11 containing executable instruction sets. The user interface 14 communicates with and monitors operator input devices including, e.g., an accelerator pedal 15, a brake pedal 16 and a transmission range selector 17. The user interface 14 determines an operator torque request based upon the aforementioned operator inputs. In one embodiment, the transmission range selector 17 includes a tap-up/tap-down feature, whereby a vehicle operator may manually select a transmission gear ratio, thus overriding transmission control. A tap-up command results in a command to the CVT 140 to increase its gear ratio, which is accomplished by increasing a speed ratio in the CVT 140. A tap-down command results in a command to the CVT 140 to decrease its gear ratio by decreasing the speed ratio in the CVT 140.

The terms controller, control module, module, control, control unit, processor and similar terms refer to various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and lookup tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link or another suitable communication link. Communication includes exchanging data signals in suitable form, including, for example, electrical signals via a conductive medium, electromagnetic signals via air, optical signals via optical waveguides, and the like. Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
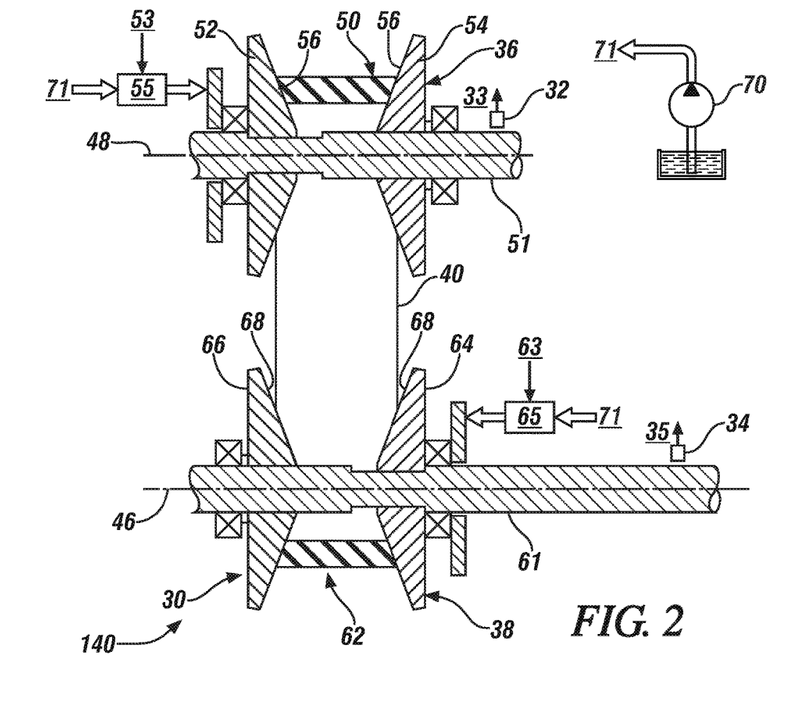
FIG. 2 schematically illustrates elements of a variator of a chain-type CVT, in accordance with the disclosure.

FIG. 2 schematically illustrates elements of one embodiment of a variator 30 of a chain-type continuously variable transmission (CVT) 140 that is advantageously controlled by a controller 12. The variator 30 transfers torque between the first rotating member 51 and the second rotating member 61. The first rotating member 51 is nominally referred to herein as input member 51, and the second rotating member 61 is nominally referred to herein as output member 61. In one embodiment, a hydraulic pump 70 fluidly couples to elements of the variator 30 to supply pressurized hydraulic fluid via a hydraulic circuit 71.

The variator 30 includes a first, or primary pulley 36, a second, or secondary pulley 38 and flexible continuous rotatable device 40 that rotatably couples the first and second pulleys 36, 38 to transfer torque therebetween. The first pulley 36 rotatably attaches to the input member 51 and the second pulley 38 rotatably attaches to the output member 61, and the continuous rotatable device 40 is adapted to transfer torque between the first and second pulleys 36, 38 and thus between the input and output members 51, 61. The first pulley 36 and input member 51 rotate about a first axis 48, and the second pulley 38 and output member 61 rotate about a second axis 46. The continuous rotatable device 40 can be a belt, a chain, or another suitable flexible continuous device. The input speed sensor 32 may be mounted near the input member 51 to generate a CVT input speed 33 that relates to a speed of the first, input pulley 36, and the output speed sensor 34 may be mounted near the output member 61 to generate a CVT output speed 35 that relates to a speed of the second, output pulley 38. One of the first and second pulleys 36, 38 acts as a ratioing pulley to establish a speed ratio and the other of the first and second pulleys 36, 38 acts as a clamping pulley to generate sufficient clamping force to transfer torque therebetween. As used herein, the term 'speed ratio' refers to a variator speed ratio, which is a ratio of a CVT output speed and a CVT input speed. The CVT input speed may be determined based upon a signal input from one of the engine speed sensor 112 (when the torque converter clutch is locked), the torque converter turbine speed sensor 125, or the input speed sensor 32, as described herein, or another suitable speed/position sensor. The CVT output speed may be determined based upon a signal input from the output speed sensor 34 or the wheel speed sensor 162 as described herein, or another suitable speed/position sensor. The speed ratio parameters are determined based upon the CVT input speed and the CVT output speed.

The first pulley 36 is split perpendicular to the first axis 48 to define an annular first groove 50 that is formed between a moveable sheave 52 and a stationary sheave 54. The moveable sheave 52 axially moves or translates along the first axis 48 relative to the stationary sheave 54. For example, the moveable first sheave 52 may be attached to the input member 51 via a splined connection, thereby allowing axial movement of the moveable first sheave 52 along the first axis 48. The stationary first sheave 54 is disposed opposite the moveable first sheave 52. The stationary first sheave 54 is axially fixed to the input member 51 along the first axis 48. As such, the stationary first sheave 54 does not move in the axial direction of the first axis 48. The moveable first sheave 52 and the stationary first sheave 54 each include a first groove surface 56. The first groove surfaces 56 of the moveable first sheave 52 and the stationary first sheave 54 are disposed opposite each other to define the annular first groove 50 therebetween. The opposed first grooved surfaces 56 preferably form an inverted frustoconical shape such that a movement of the moveable first sheave 52 towards the stationary first sheave 54 increases an outer pulley diameter of the annular first groove 50. An actuator 55 is arranged with the first pulley 36 to control an axial position of the moveable first sheave 52 in response to a drive signal 53, including urging the moveable first sheave 52 towards the stationary first sheave 54. In one embodiment, the actuator 55 is a hydraulically-controlled device, e.g., a valve that fluidly couples to the hydraulic circuit 71 and the drive signal 53 is a hydraulic pressure signal that corresponds to a clamping pressure exerted by the first pulley 36 on the continuous rotatable device 40.

The second pulley 38 is split perpendicular to the second axis 46 to define an annular second groove 62 therebetween. The annular second groove 62 is disposed perpendicular to the second axis 46. The second pulley 38 includes a moveable sheave 64 and a stationary sheave 66. The moveable sheave 64 axially moves or translates along the second axis 46 relative to the stationary sheave 66. For example, the moveable second sheave 64 may be attached to the output member 61 via a splined connection, thereby allowing axial movement of the moveable second sheave 64 along the second axis 46. The stationary second sheave 66 is disposed opposite the moveable second sheave 64. The stationary second sheave 66 is axially fixed to the output member 61 along the second axis 46. As such, the stationary second sheave 66 does not move in the axial direction of the second axis 46. The moveable second sheave 64 and the stationary second sheave 66 each include a second groove surface 68. The second groove surfaces 68 of the moveable second sheave 64 and the stationary second sheave 66 are disposed opposite each other to define the annular second groove 62 therebetween. The opposed second grooved surfaces 68 preferably form an inverted frustoconical shape such that a movement of the moveable second sheave 64 towards the stationary second sheave 66 increases an outer pulley diameter of the annular second groove 62. An actuator 65 is arranged with the second pulley 38 to control an axial position of the moveable second sheave 64 in response to a driven signal 63, including urging the moveable second sheave 64 towards the stationary second sheave 66. In one embodiment, the actuator 65 is a hydraulically-controlled device, e.g., a valve that fluidly couples to the hydraulic circuit 71 and the driven signal 63 is a hydraulic pressure signal that corresponds to a clamping pressure exerted by the second pulley 38 on the continuous rotatable device 40. A ratio of the outer pulley diameter of the first pulley 36 and the outer pulley diameter of the second pulley 38 defines a transmission speed ratio. Other elements, such as clutch assemblies in the form of selectable one-way clutches and the like may be deployed between the variator 30 and other powertrain and driveline components and systems.

Control routines for embodiments of the powertrain system 100 including the engine 110 and CVT 140 may be implemented to provide tractive effort when employed on a vehicle. One purpose of a control routine may be to track commanded operating states with zero or minimal steady-state tracking error and with rapid, smooth responsiveness to output torque requests. This includes accounting for and controlling system operation, including engine torque management, system capabilities such as hydraulic line pressures in the transmission, system and component temperatures, measurement capabilities of sensors, and other factors.

Figure 3:
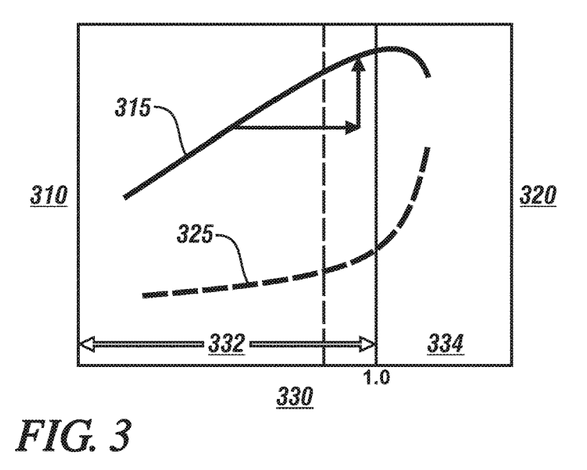
FIG. 3 graphically shows relationships associated with operation of an embodiment of the CVT that is described with reference to FIGS. 1 and 2, in accordance with the disclosure.

FIG. 3 graphically shows relationships associated with operation of a CVT, including vertical axes indicating efficiency 310 and belt or chain slip 320, which are plotted in relation to a horizontal axis indicating torque capacity ratio 330, with such elements described with reference to operation of an embodiment of the CVT 140 that is described with reference to FIGS. 1 and 2. Terms such as input power, input torque, input speed, etc., are related to parameters associated with the engine 110, the input member 51 and the first pulley 36. Terms such as output power, output torque, output speed, etc., are related to parameters associated with the output member 61, the second pulley 38 and the driveline 150. The torque capacity ratio is defined to be a ratio between input torque to the CVT 140 and a maximum torque able to be transmitted by the CVT 140. Efficiency is defined to be a magnitude of output power in relation to input power, which can be calculated as follows:

$$\text{Efficiency} = (\text{Output Torque} * \text{Output Speed})/(\text{Input Torque} * \text{Input Speed}) \quad [1]$$

Line 315 represents efficiency in relation to the torque capacity ratio, and line 325 represents belt or chain slip in relation to the torque capacity ratio. The torque capacity ratio is separated into a micro-slip region 332 and a macro-slip region 334, wherein the micro-slip region 332 indicates a torque capacity ratio that is less than 1.0 and the macro-slip region 334 indicates a torque capacity ratio that is greater than 1.0. The macro-slip region 334 is associated with operating conditions at which the clamping pressures exerted by the first and second pulleys 36, 38 on the continuous rotatable device 40 are low, resulting in significant belt or chain slip events that can decrease service life of the continuous rotatable device 40. As indicated by line 315, the efficiency increases with an increase in the torque capacity ratio until the torque capacity ratio approaches a unity value, i.e., 1.0. There is a corresponding increase in the belt or chain slip, as indicated by line 325. At torque capacity ratio levels greater than 1.0, the belt or chain slip increases significantly and the efficiency decreases significantly. The relationships shown with reference to FIG. 3 are indicative of performance characteristics of CVT devices that employ first and second pulleys rotatably coupled by belts, chains, or other continuous rotatable devices.

Figure 4:
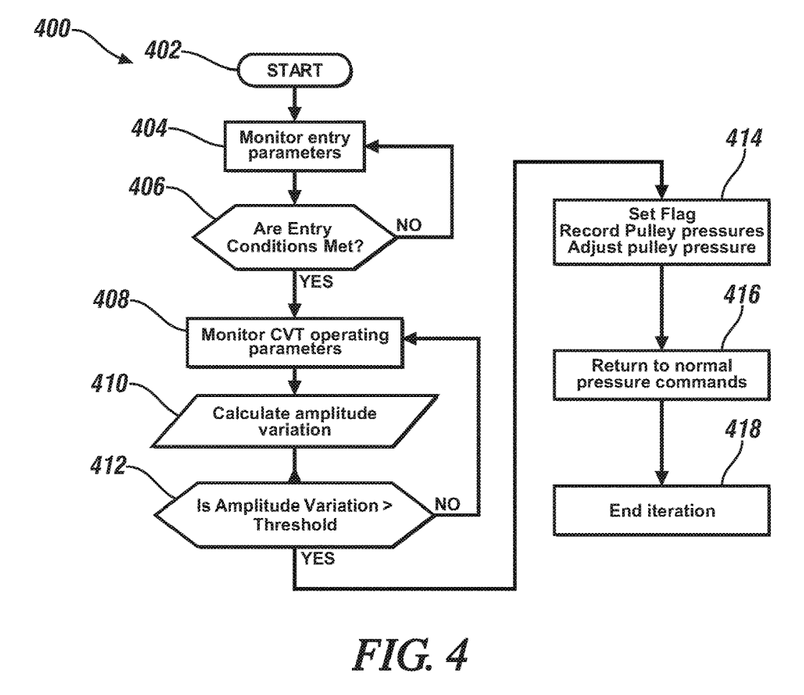
FIG. 4 schematically shows a process for monitoring operation of a CVT including a macro-slip detection routine, which can be executed to monitor and control operation of an embodiment of the CVT that is described with reference to FIGS. 1 and 2, in accordance with the disclosure.

FIG. 4 schematically shows a process for monitoring operation of a CVT, including a macro-slip detection routine 400 that can be executed to monitor and control operation of an embodiment of the CVT 140 that is described with reference to FIGS. 1 and 2. Table 1 is provided as a key wherein the numerically labeled blocks and the corresponding functions are set forth as follows, corresponding to the macro-slip detection routine 400. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
|---|---|
| 402 | Start iteration |
| 404 | Monitor entry parameters associated with operation of the CVT |
| 406 | Are entry conditions achieved? |
| 408 | Monitor CVT operating parameters |

TABLE 1-continued

| BLOCK | BLOCK CONTENTS |
|---|---|
| 410 | Calculate amplitude variation for each CVT operating parameter |
| 412 | Is amplitude variation greater than a threshold value? |
| 414 | Set Flag; Record pulley pressure commands for primary and secondary pulleys as minimum pressures; Increase primary and secondary pulley pressures to high values |
| 416 | Return to normal pressure command control and adjust pressure based upon newly detected minimum pressures. |
| 418 | End iteration |

Execution of the macro-slip detection routine 400 may proceed as follows, and is preferably executed at regular intervals. The steps may be executed in a suitable order, and are not limited to the order described with reference to FIG. 4.

Each iteration (402), entry parameters associated with operation of the CVT and the powertrain system are periodically monitored. The entry parameters indicate whether the powertrain system and specifically the CVT is operating in a substantially steady-state condition, such as a slow variation in a commanded CVT gear ratio. Monitored states associated with the entry parameters of operating in a substantially steady-state condition can include, by way of non-limiting examples, operator input to the accelerator pedal, rough road detection as may be indicated by individual wheel speed sensors on the vehicle, and other factors (404). When the entry conditions are not met (406)(0), monitoring continues (404).

When the entry conditions are met (406)(1), monitored data associated with CVT operating parameters is captured for analysis. CVT operating parameters can be determined by directly sensing an operating state of an element of the CVT, or can be otherwise determined based upon indirect sensing and modeling. Monitored CVT operating parameters can include CVT input and output speeds, which are indicated by the CVT variator input speed sensor 32 and the CVT variator output speed sensor 34, respectively. Alternatively, or in addition, the monitored CVT operating parameters can include the hydraulic pressure signals associated with the first pulley 36 and the second pulley 38, i.e., the drive signal 53 and the driven signal 63, respectively. Alternatively, or in addition, the CVT operating parameters can include input and output torque sensors that can be disposed on the input and output members, respectively.

The CVT operating parameters are analyzed, with such analysis including determining an amplitude variation associated with one or more of the CVT operating parameters (408). The amplitude variation can be determined by analyzing raw data or processed data (410). The amplitude variation(s) is evaluated in context of a corresponding threshold level (412), and when the amplitude variation(s) is greater than the corresponding threshold level (412)(1), a flag is set in software indicating that a macro-slip event has been detected (414). The threshold for the amplitude variation can be determined in relation to and influenced by various operating parameters, including, e.g., input torque, input speed, commanded gear ratio, transmission temperature, etc. Otherwise (412)(0), this iteration ends (418).

Coincident with setting in the software to indicate that a macro-slip event has been detected (414), pulley pressures, i.e., the hydraulic pressure signals associated with the first pulley 36 and the second pulley 38 are recorded as minimum pressures at the present driving conditions, e.g., speed and load, for adaptive control of the CVT 140. The different driving conditions can be characterized in terms of input torque, input speed, speed ratio, and transmission temperature, and have different minimum pressures that can be recorded as a table lookup in a memory device. By way of example, subsequent pressure commands for controlling the CVT 140 employ the minimum pressures for the first pulley 36 and the second pulley 38 at that driving condition. Furthermore the primary and second pulley pressures are increased to high values to rapidly end the macro-slip state.

Once it has been detected that the macro-slip state has ended, the pressure commands for the first pulley 36 and the second pulley 38 are decreased to normal states, and operation of the CVT 140 is controlled employing the recorded minimum pressures to provide adaptive control of the CVT 140 (416) and this iteration ends (418).

Figure 5:
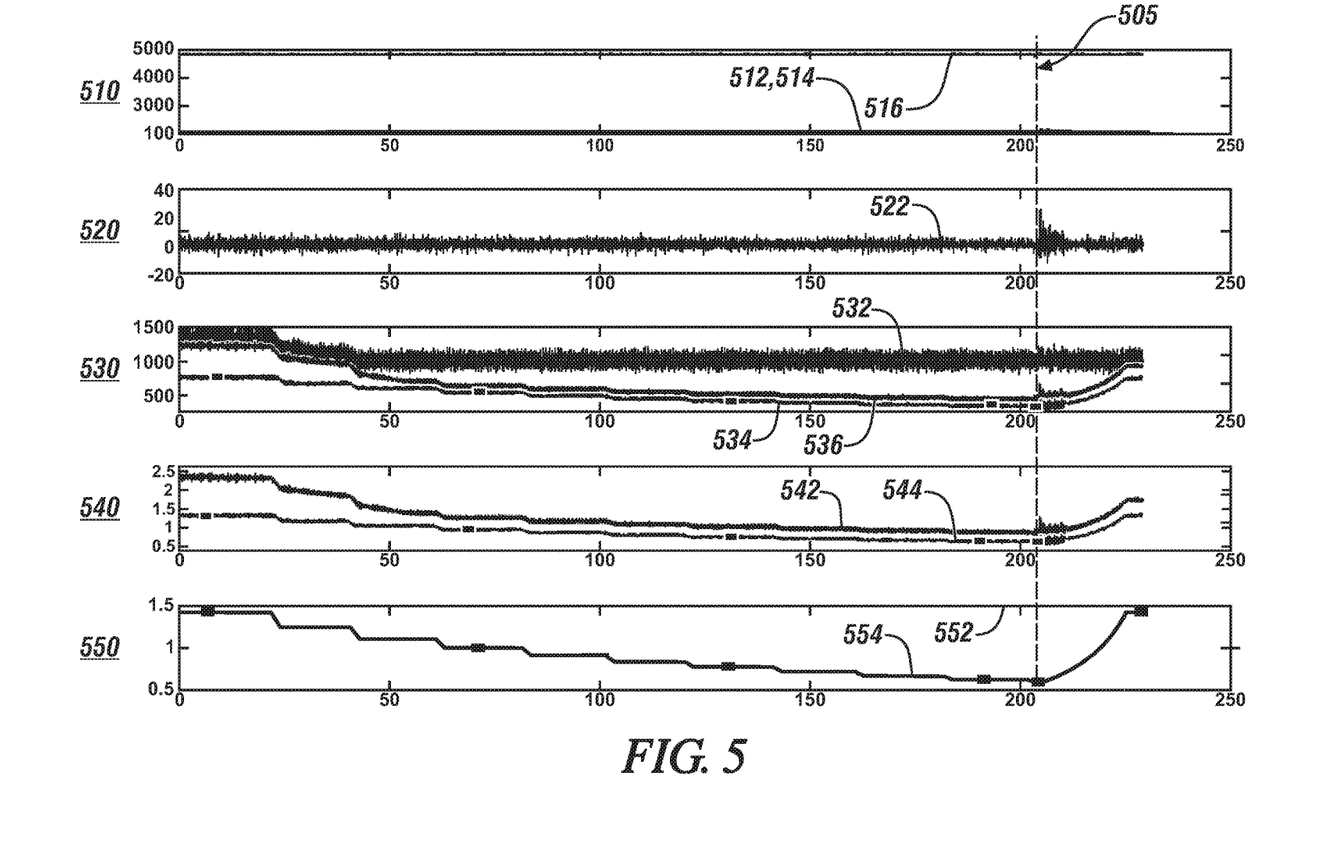
FIGS. 5 and 6 graphically show various CVT operating parameters for an embodiment of the powertrain system described with reference to FIG. 1, operating at a steady state speed and load conditions and a steady state speed ratio, wherein the pulley forces are decreased in relation to elapsed time in accordance with the disclosure.

FIG. 5 graphically shows various CVT operating parameters for an embodiment of the powertrain system described with reference to FIG. 1, operating at a steady state speed and load conditions and a steady state speed ratio, wherein the pulley forces are decreased in relation to elapsed time (on the horizontal axis). Plotted datagraphs are indicated on the various vertical axes, and includes monitored parameters including various speeds (rpm) 510, torque converter clutch slip speed (rpm) 520, hydraulic pressures (kPa) 530, pulley forces (N) 540 and a risk factor 550. Occurrence of a macro-slip event is indicated by line 505. The various speeds (rpm) 510 include engine speed 512, input pulley speed 514, and output pulley speed 516. The torque converter clutch slip speed (rpm) 520 includes torque converter clutch slip speed 522. The hydraulic pressures (kPa) 530 include hydraulic line pressure 532, primary pulley pressure 536 and secondary pulley pressure 534. The pulley forces (N) 540 include input pulley force 542 and output pulley force 544. The risk factor 550 includes a primary pulley risk factor 552 and a secondary pulley risk factor 554. As indicated, there is a discernible change in each of the torque converter clutch slip speed 522, the primary pulley pressure 536 and secondary pulley pressure 534, and the input pulley force 542 and output pulley force 544 at the occurrence of the macro-slip event 505. As such, the occurrence of the macro-slip event 505 can be determined and thus detected by analysis of one or more of the aforementioned parameters, specifically by monitoring pressure or torque parameters FIG. 6 graphically shows various CVT operating parameters for an embodiment of the powertrain system described with reference to FIG. 1, operating at a steady state speed and load conditions and a steady state speed ratio, wherein the pulley forces are decreased in relation to elapsed time (on the horizontal axis). Plotted datagraphs are indicated on the various vertical axes, and includes monitored parameters including input torque (N) 610, input speed (rpm) 620, output speed (rpm) 630, speed ratio (rpm/rpm) 640 and a risk factor 650. Occurrence of a macro-slip event is indicated by line 605.

Figure 6:
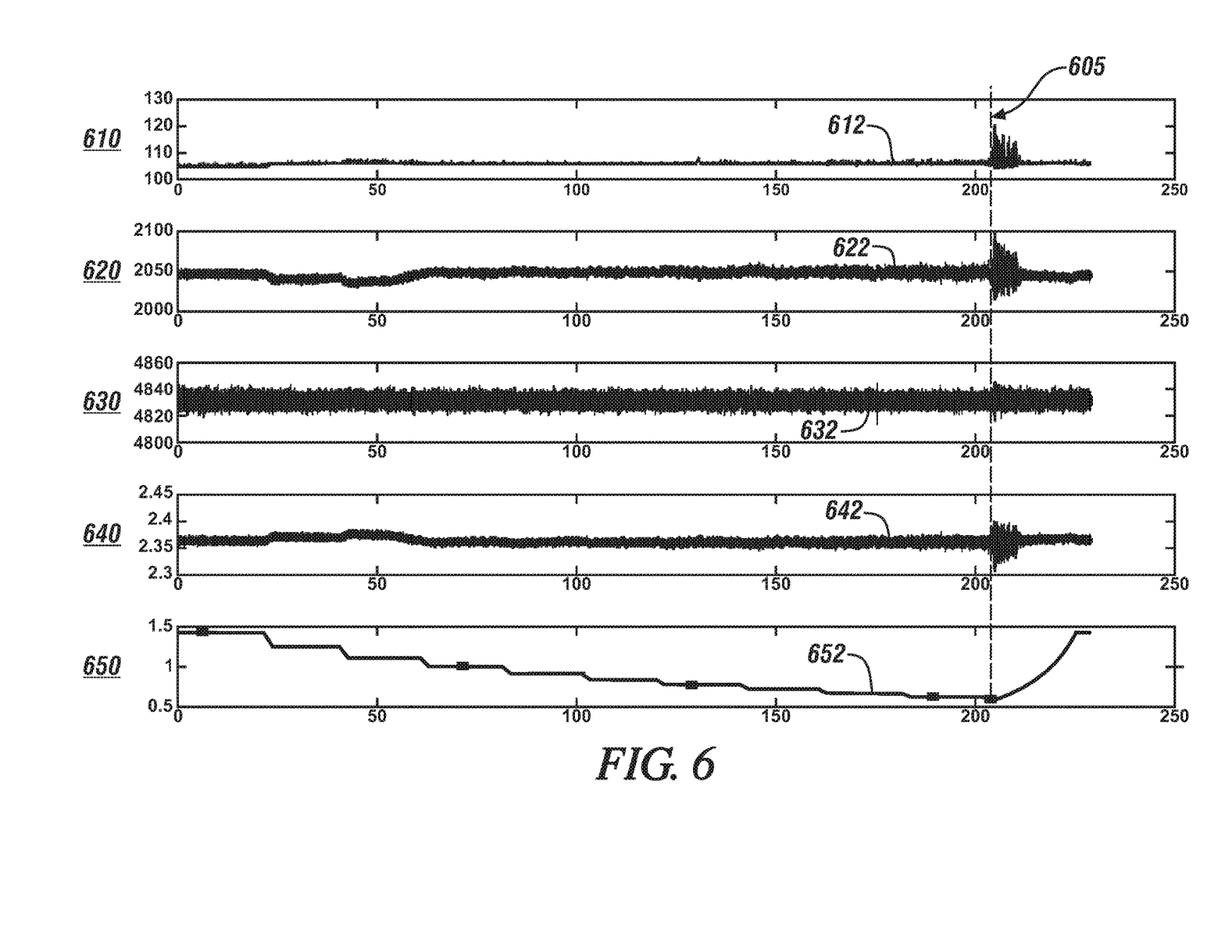

The input torque (N) 610 is indicated by line 612, the input speed (rpm) 620 is indicated by line 622, the output speed (rpm) 630 is indicated by line 632, the speed ratio (rpm/rpm) 640 is indicated by line 642, and the risk factor 650 is indicated by line 652. As indicated, there is a discernible change in each of the input torque 612, the input speed 622, the output speed 632, the speed ratio 642 and the risk factor 652 at the occurrence of the macro-slip event 605. As such, the occurrence of the macro-slip event 605 can be determined and thus detected by analysis of one or more of the aforementioned parameters.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling a continuously variable transmission (CVT), wherein the CVT is disposed in a powertrain system to transfer mechanical power between a torque generating device and a driveline, wherein the CVT includes an input member that is coupled to a first pulley and an output member that is coupled to a second pulley and wherein the first pulley is rotatably coupled to the second pulley via a flexible continuous device that is disposed to transfer torque therebetween, the method comprising:
dynamically monitoring operating parameters associated with an input force and an output force of the CVT;
determining an amplitude variation of one of the operating parameters;
detecting, via a controller, an impending slip event based upon the amplitude variation, wherein the impending slip event is associated with a macro-slip condition on the flexible continuous device; and
controlling operation of the CVT to preclude the impending slip event.

2. The method of claim 1:
wherein controlling the operation of the CVT comprises controlling pressure commands to the first and second pulleys; and
wherein the method further comprises:
monitoring the pressure commands to the first and second pulleys;
determining magnitudes of the pressure commands to the first and second pulleys associated with the impending slip event; and
setting minimum allowable pressure commands for the first and second pulleys based upon the magnitudes of the pressure commands to the first and second pulleys associated with the occurrence of the macro-slip condition.

3. The method of claim 1, wherein the macro-slip condition comprises an under-pressure condition on the flexible continuous device.

4. The method of claim 1, wherein dynamically monitoring operating parameters associated with an input force and an output force of the CVT comprises dynamically monitoring rotational speeds of the input and output members.

5. The method of claim 1, wherein dynamically monitoring operating parameters associated with an input force and an output force of the CVT comprises dynamically monitoring clamping pressures exerted by the first and second pulleys on the continuous rotatable device.

6. The method of claim 1, wherein dynamically monitoring operating parameters associated with an input force and an output force of the CVT comprises dynamically monitoring torsional forces on the input and output members.

7. The method of claim 1, wherein monitoring amplitude variation of one of the operating parameters comprises monitoring a quantity of occurrences wherein the amplitude of the operating parameter is greater than a threshold amplitude.

8. A powertrain system disposed to transfer mechanical power to a driveline, comprising:
- a torque generating device disposed to transfer torque to the driveline via a continuously variable transmission (CVT), wherein the CVT includes an input member that is coupled to a first pulley and an output member that is coupled to a second pulley and wherein the first pulley is rotatably coupled to the second pulley via a flexible continuous device that is disposed to transfer torque therebetween,
- a controller including a processor and memory, the controller operatively connected to the CVT, the controller including an instruction set, the instruction set executable to:
- dynamically monitor operating parameters associated with an input force and an output force of the CVT;
- determine an amplitude variation of one of the operating parameters;
- detect, via the controller, an impending slip event based upon the amplitude variation, wherein the impending slip event is associated with a macro-slip condition on the flexible continuous device; and
- control operation of the CVT to preclude the impending slip event.

9. The powertrain system of claim 8,
- wherein the controller is disposed to control commands to the first and second pulleys; and
- wherein the instruction set is further executable to:
- monitor the pressure commands to the first and second pulleys;
- determine magnitudes of the pressure commands to the first and second pulleys associated with the impending slip event; and
- set minimum allowable pressure commands for the first and second pulleys based upon the magnitudes of the pressure commands to the first and second pulleys associated with the occurrence of the macro-slip condition.

10. The powertrain system of claim 8, wherein the macro-slip condition comprises an under-pressure condition on the flexible continuous device.

11. The powertrain system of claim 8, wherein the instruction set executable to dynamically monitor operating parameters associated with an input force and an output force of the CVT comprises the instruction set executable to dynamically monitor rotational speeds of the input and output members.

12. The powertrain system of claim 8, wherein the instruction set executable to dynamically monitor operating parameters associated with an input force and an output force of the CVT comprises the instruction set executable to dynamically monitor clamping pressures exerted by the first and second pulleys on the continuous rotatable device.

13. The powertrain system of claim 8, wherein the instruction set executable to dynamically monitor operating parameters associated with an input force and an output force of the CVT comprises the instruction set executable to dynamically monitor torsional forces on the input and output members.

14. The powertrain system of claim 8, wherein the instruction set executable to dynamically monitor amplitude variation of one of the operating parameters comprises the instruction set executable to dynamically monitor a quantity of occurrences wherein the amplitude of the operating parameter is greater than a threshold amplitude.

15. The powertrain system of claim 8, wherein the torque generative device comprises an internal combustion engine.

16. The powertrain system of claim 8, wherein the torque generative device comprises an electric machine.

17. The powertrain system of claim 8, wherein the torque generative device comprises one of a hydraulic or a pneumatic machine.

* * * * *